United States Patent Office.

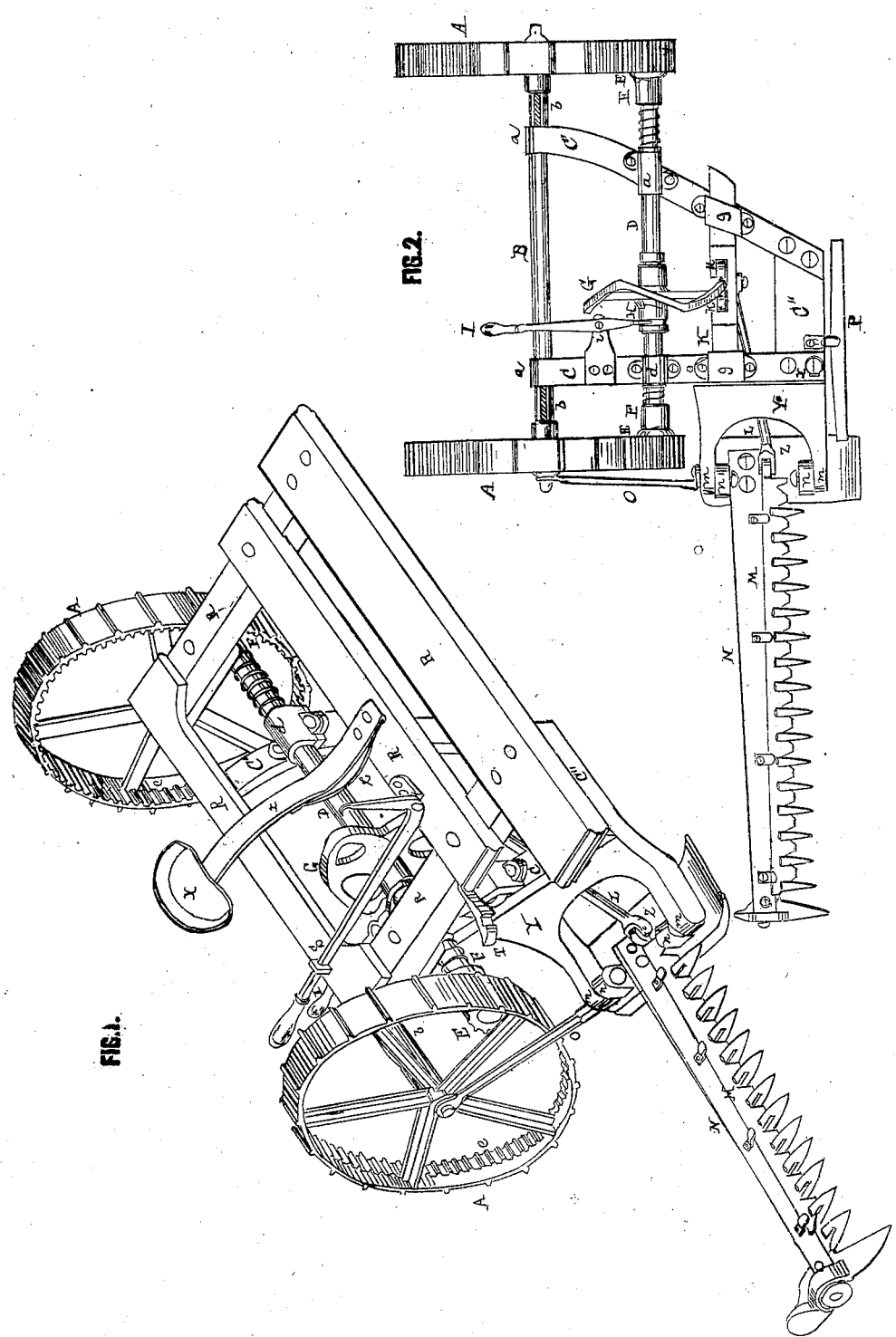
D. G. Norris,
Mower
Nº 55,780 — Patented June 19, 1866

DANIEL G. NORRIS, OF ST. JOHNSBURY, VERMONT, ASSIGNOR TO HIMSELF, JOHN H. PADDOCK, AND RUFUS S. MERRILL.

IMPROVEMENT IN HARVESTERS.

Specification forming part of Letters Patent No. 55,780, dated June 19, 1866.

*To all whom it may concern:*

Be it known that I, DANIEL G. NORRIS, of St. Johnsbury, in the county of Caledonia and State of Vermont, have invented certain new and useful Improvements in Harvesters; and I hereby declare the following to be a full, clear, and exact description of the same, reference being had to the accompanying drawings, in which—

Figure 1 represents an isometrical perspective view of a harvester constructed in accordance with my invention; and Fig. 2 is a plan view of the same, the wooden frame being removed in order to show more clearly the arrangement of the cutter-frame and the parts secured to it.

My invention consists in so making the apparatus of a harvester or mowing-machine and simplifying the arrangement of parts employed in its construction that, while effective in its operation and adapted to the uses for which it is designed, it may also be of light draft, so as to be easily drawn by one horse, and constructed at less expense than other harvesters of equal power.

In the harvester or mowing-machine of ordinary construction the apparatus whereby the cutting part of the machine is operated is usually so complicated and the frame of the machine itself is so heavy and cumbersome, and both are so often liable to get out of order and to need repair, that it becomes a great desideratum to obviate these difficulties and to employ a more simple combination of parts without detracting, of course, from the efficiency of the machine, and it is evident that any method by which these results can be accomplished will be productive not only of a saving on the prime cost of the machine, but also in the labor needed to properly operate it.

The object of my invention is to effect these improvements, which, in order that they may be better and more fully understood, I will now describe by reference to the accompanying drawings.

The driving-wheels A (shown in the drawings) are of ordinary construction, such as are usually employed in harvesters, with racks on their inner surfaces, by means of which, in combination with the pinions on the counter-shaft D, as hereinafter explained, motion is communicated to the cutter-bar.

The driving-wheels are connected, the one with the other, by a shaft, B, which forms their common axle, and to which the two frames of the machine are hinged, the one C being the metal cutter-frame for supporting the mechanism, and the other, R, the wooden frame, on which the operator may stand or sit. The latter frame is hinged to the axle B at $b$ $b$ in such manner that the hinges shall be contiguous to the hubs of the driving-wheels, respectively, and to it are attached the shafts for the horse or other animal used to draw the machine. The cutter-frame C is hinged to the axle B at $a$ $a$, the outer face of each of the latter hinges being contiguous to the inner faces of the corresponding hinges of the wooden frame. By this arrangement it will be seen that the main parts of the machine—*i. e.*, the driving mechanism, the cutter-frame, and the platform—are all united upon one and the same shaft, and are suitably braced, and are held in position upon it by the pins which hold the driving-wheels on their journals. So long, therefore, as the wheels are properly mounted no lateral play of either frame can take place, and by this unalterable mode of adjustment the parts receiving and transmitting movement are always maintained in their proper relations.

To the cutter-frame C the draft-bar or whiffletree P is secured, for the purposes hereinafter explained.

From the peculiar arrangement of the two frames thus described important advantages arise. Although they have the axle B in common, yet each frame is capable of distinct and separate oscillatory motion, and it will be seen that on account of this fact the horse may be made to sustain the weight of the wooden frame only and be relieved in great measure from the weight of the metal cutter-frame. To effect this I have, as above stated, attached the shafts to the wooden frame, and the whiffletree to the cutter or draft frame.

When the horse is placed between the shafts and they are secured in the harness at his sides the weight of the wooden frame will of course rest partially upon his back; but as he is attached to the cutter-frame by means of traces, which are secured to the whiffletree, the latter frame will necessarily rest on the ground, and the horse will be in great measure spared its weight. At the same time, when the horse is pulling in the traces it will be seen that a lifting-draft is thereby obtained on the cutter-bar, sufficient to prevent it from being driven into the ground, which might occur were the shoe of the frame allowed to drag heavily on the ground.

It is chiefly important that the horse should be relieved from the superincumbent weight of the cutter or draft frame while the machine is in operation, and therefore in going to or returning from work, or for any special reason during the progress of the work, if it be desired to raise the metal from the ground, this can easily be done by engaging the hook on the end of a lever-handle S, on the frame R, with a chain fastened to the cutter-frame at the point $x$. The two frames may be thus connected, the weight of the metal frame, which is lifted from the ground by means of the lever S, coming in this case upon the back of the horse.

The cutter-frame consists of three parts: first, the inner bar, C, on the side nearest the cutter-bar, perpendicular to the axle B, to which it is hinged; second, the outer bar, C', likewise hinged to the axle B, not perpendicularly, but obliquely thereto, so as to incline toward the bar C; third, the cross-bar $C^2$, which joins the two side bars at their outer extremities, and to which is secured the whiffletree P, as above mentioned.

On the bar C, and so as to extend inwardly to face the interior driving-wheel, is attached the main hinge Y, with which is connected by means of a hinge-joint the shoe and cutting apparatus. This hinge-piece V is formed in one piece with the cross-bar $C^2$, and is curved downwardly so as to hold the cutter-bar at a slight elevation from the ground when the machine is drawn as before said.

Ears $m$ $m'$ are formed on the inner end by recessing the hinge, as shown in the drawings, which also allows a free play of the connecting-rod L and reduces the weight of the hinge-piece itself.

But little metal is used in making the cutter-frame, which, as is seen, is of very simple construction, so that it may be of no more weight than is consistent with strength. The use to which it is put is to support and hold in place the mechanism for working the cutter-bar, and in order to strengthen it and give it additional steadiness for this purpose a stay-rod, O, is secured on that part of the axle B just outside of the heel of the right-hand or inner driving-wheel, A, whence it extends to the base of the hinge-piece, which forms part of the cutter-frame, to which it is firmly secured. The stay-rod, being hinged to or secured on the same axis as the cutter-frame, is thus capable of motion with it on the axis, while at the same time it steadies and prevents effectually any giving or yielding of the frame in a forward or backward direction.

About midway on the cutter-frame are the collars $d$ $d$, in which the pinion or counter-shaft D has its bearings.

On each end of the shaft is a loose pinion, E, and the shaft is secured to the cutter-frame relatively to the driving-wheels A so that the pinions E E mesh in with the racks $e$ $e$ on the driving-wheels. The inner faces of these pinions are provided with clutch-teeth, which, in combination with the spring-clutches F on the shaft D, impart a rotary motion to the latter when the machine moves forward. The clutches are so arranged that when the harvester is backed the teeth of the pinion will ride over the teeth of the clutch, the latter being capable of a sliding motion on the shaft, and thus the shaft is prevented from revolving backward; but as soon as the machine again starts ahead the spiral springs which press against the rear faces of the clutches F cause them to catch or engage the clutch-teeth on the pinions E E and to effect the rotation of the shaft as before.

The shaft transmits its motion to the cutter-bar through the medium of the cam-wheel G, which is located on that part of the shaft between the bars C C' of the cutter-frame. This wheel may be of any ordinary or suitable construction, and it is placed loosely on the shaft, so that it may or may not revolve with the shaft, at the pleasure of the operator. On the inner face of its hub are clutch-teeth, which correspond with a clutch, H, secured on and revolving with the shaft D. This latter clutch has a sliding motion on the shaft, and is so placed that it may easily catch the clutch-teeth on the cam-wheel, and is actuated by means of a lever, I, pivoted at $i$ to the inner bar, C.

When it is desired to communicate the motion of the shaft to the cam-wheel, the clutch H, by means of the lever I, is moved up so as to engage the corresponding teeth on the cam-wheel, which being done the wheel revolves with the shaft. The motion of the cam-wheel is stopped by unlocking the clutch, in which case, being no longer actuated by the clutch H, the wheel ceases to revolve.

When the cam-wheel is revolving it imparts a reciprocating motion to a bar, K, which slides in suitable guides $g$ $g$, secured to the two side bars, C C', and is so placed as to be parallel with the shaft D and axle B. This bar is recessed on the side toward the cam-wheel, so as to admit of two friction-rollers being placed in said recess opposite to each other in such direction that the plane of their revolution may be at right angles with the plane of revolution of the cam-wheel, in which position they are supported in suitable bearings. The distance between the peripheries of the two friction-rollers must be such as will admit of the cam-wheel passing between them. The sliding bar is so placed on the cutter-frame that the edge of the wheel will be between the rollers. Thus when the cam revolves it causes the bar K to slide back and forth in the guides $g$ $g$. This reciprocating motion is communicated to the cutter-bar M by the connecting-rod or pitman L, one end of which is hinged to the inner end of the cutter-bar and the other is hinged likewise to a projection or ear on the under side of the sliding bar K.

The cutting apparatus is rigidly connected with the shoe Z, which is provided with two ears, n n', whereby it is hinged to the piece V, before referred to.

When the machine is to be dragged over roads the cutter-bar may be lifted or turned up, and maintained in such position by a spring-catch, T, attached to the platform R.

The driver's seat X is secured to the platform by means of a spring-bar, x, which is braced by an auxiliary spring, z, and curved backward and upward in such a manner as that the weight of the operator may in some degree equilibrate the platform and relieve the horse of its weight.

Having thus described my improvements and the manner in which the same are or may be carried into effect, what I claim as my invention, and desire to secure by Letters Patent, is—

1. In mowing-machines constructed and operating substantially as herein described, the combination, with the recessed sliding bar provided with friction-rollers, as hereinbefore described, of the cam-wheel on the pinion-shaft, said sliding bar communicating its movement to the cutter-bar through the medium of a connecting-rod or pitman hinged to the sliding bar, as set forth, the whole being arranged and operating substantially as shown and described.

2. In combination with the recessed sliding bar, as described, the pinion-shaft revolving in bearing on the cutter-frame, when arranged relatively to the driving-pinions as set forth, and having the cam-wheel located within and the self-adjusting clutches without the cutter-frame upon the said shaft, as and for the purposes herein shown and described.

3. In mowing-machines arranged and operating as described, attaching the whiffletree directly to the metal cutter-frame, and shafts to the wooden frame, as and for the purposes herein described.

In testimony whereof I have signed my name to this specification before two subscribing witnesses.

DANIEL G. NORRIS.

Witnesses:
HENRY P. ALDEN,
N. P. LOVERING, Jr.